Sept. 12, 1967     E. D. KANE ETAL     3,341,221
HYDRAULIC STAKE
Filed Feb. 3, 1965     2 Sheets-Sheet 1
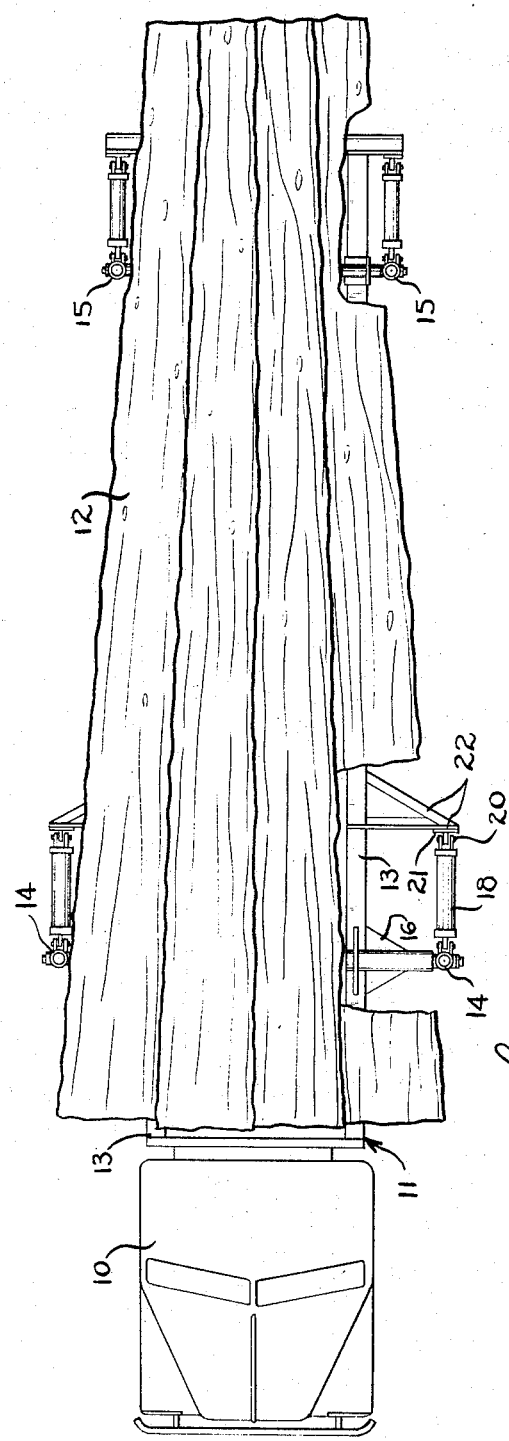
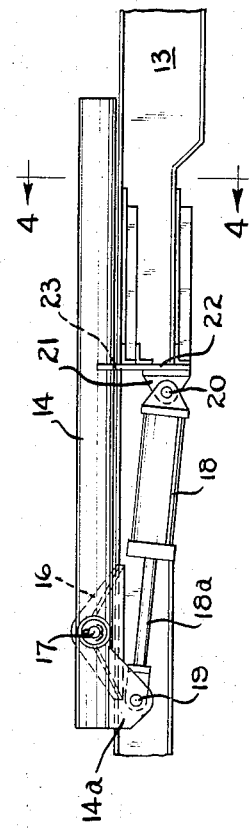
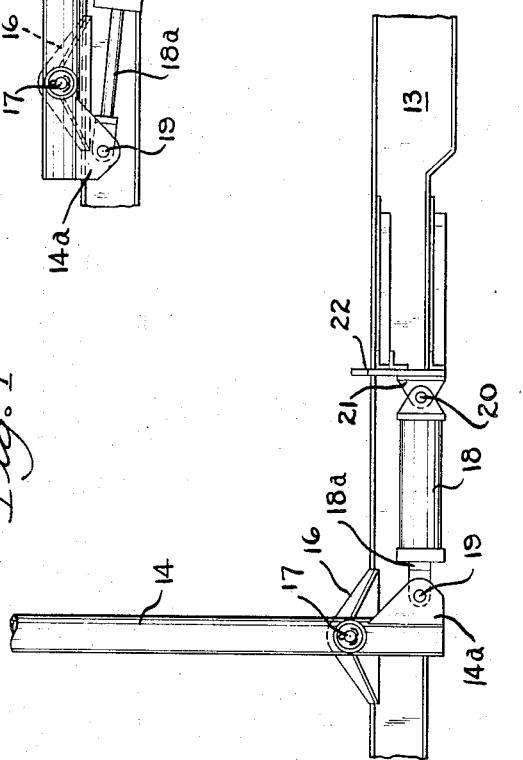
INVENTORS
ERIC D. KANE
OLE E. OLSON
BY
ATTORNEY Sept. 12, 1967    E. D. KANE ETAL    3,341,221
HYDRAULIC STAKE Filed Feb. 3, 1965    2 Sheets-Sheet 2

INVENTORS
ERIC D. KANE
OLE E. OLSON
BY
George S. Verhage
ATTORNEY

United States Patent Office 3,341,221
Patented Sept. 12, 1967

3,341,221
HYDRAULIC STAKE
Eric D. Kane, Marathon, Ontario, and Ole E. Olson, Caramat, Ontario, Canada, assignors to American Can Company, New York, N.Y., a corporation of New Jersey
Filed Feb. 3, 1965, Ser. No. 430,217
3 Claims. (Cl. 280—145)

This invention relates to log hauling vehicles and more particularly to means for retaining logs on and releasing logs from such vehicles.

In log hauling trucks of the tandem or tractor-trailer type, the log retaining and releasing stakes on the trailer are of three general types: stationary, removable and pivotable.

Stakes of the first type are permanently fixed in upright log retaining position on the trailer and the logs must be unloaded by lifting them over the stakes with heavy duty log handling equipment. The second type of stake is that which is carried in a socket in the side of the trailer and which can be completely removed by lifting out of the socket to permit the logs to drop over the side of the trailer. Stakes of this second type have the obvious disadvantage that they must be removed either by pounding the stake out of the socket from the bottom or by pulling the stake out by suitable means such as by grasping the top of the stake with the jaws of a crane or similar logging yard equipment. The use of stationary and removable types of stakes makes for relatively slow and expensive unloading operations.

The third type of stake is that which is pivotably mounted on a side of a trailer for swinging movement outwardly from the trailer, that is, transversely of the length of the logs and trailer, about a pivot pin which is disposed substantially parallel to the length of the logs and trailer. This third type of pivotable stake is the one in most widespread use today and has numerous advantages over the first two types of stakes. On the other hand, it has the disadvantage that when the stakes are pivoted downwardly and outwardly of the trailer to drop the load of logs, as illustrated in FIGURE 5, the logs come to rest against the stake and therefore the truck cannot be moved without bending or otherwise damaging the stakes until the logs have been pulled away from the stakes. Thus, the unloading time is much greater than if the truck could start on its return trip immediately upon dropping its load of logs. The disadvantage of this third type of stake is multiplied when the length of the stake is greater than the distance from its hinge pin at the top of the trailer platform to the ground because the stakes are then driven into the ground by the logs as seen in FIGURE 5. The stakes in most widespread use are either this longer type because they facilitate the loading of the logging trucks to their full weight carrying capacity and thus make the hauling operation most efficient or two-piece stakes, the tops of which are separated when the load is released. The latter type has the further objection that re-installation is difficult.

In view of the above, it is an object of this invention to provide releasable log retaining means which obviate the shortcomings of the aforementioned types of stakes by providing a new pivotable type stake means which swings downwardly in a direction substantially parallel to the length of the logs and trailer.

Another object is to provide a log retaining system which increases the safety of the log-hauling operation by making it possible to control the unloading and stake relocating operations from the cab of the vehicle.

Further objects and advantages of this invention will be apparent from the following description taken in connection with the accompanying drawings in which:

FIGURE 1 is a plan view of a log hauling vehicle with stakes shown in their upright log retaining position, portions of the logs being removed to expose the log retaining device, FIGURE 2 is an enlarged view of the front left side stake of FIGURE 1 in its upright, log retaining position.

FIGURE 3 is an enlarged view of the front left side stake of FIGURE 1 in its horizontal log releasing position.

Figure 4:
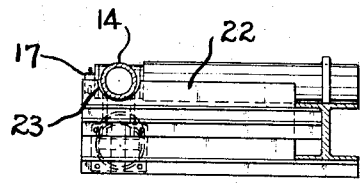
FIGURE 4 is a cross sectional view taken along line 4—4 of FIGURE 3.
Figure 5:
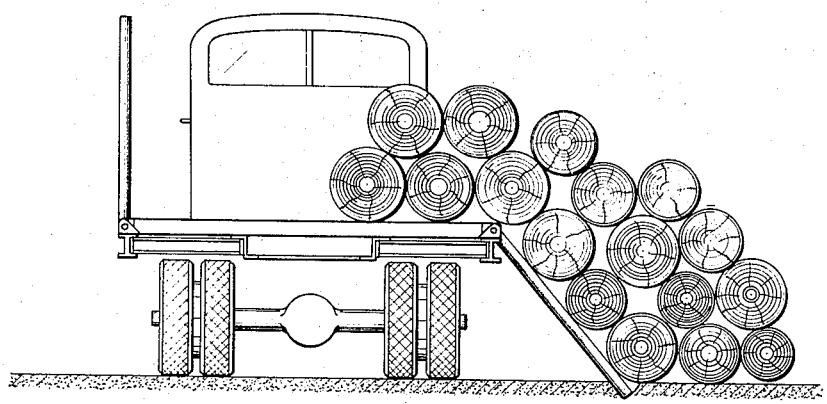
FIGURE 5 is a rear view of a log hauling vehicle showing the well known outwardly pivotable type stake.

Referring more particularly to the drawings, FIGURE 1 shows a logging truck comprising generally a tractor 10 and a trailer 11 having a load of logs 12 thereon. The trailer may consist simply of a log supporting frame 13 or may have a log supporting platform or bed which forms the upper surface thereof. Attached to the sides of the trailer are a pair of pivotable front stakes 14 and a pair of pivotable rear stakes 15 for retaining logs on and releasing logs from the trailer. The stakes are preferably made of steel pipe.

It will be noted from FIGURE 1 that the front stakes 14 are mounted by brackets 16 which are attached to the trailer frame. The frontstakes 14 are shown to be spaced farther apart than the rear stakes 15 to accommodate the natural taper of the logs which often are carried with their butt ends, that is, their larger diameter ends forward. Since the stakes are preferably adapted to pivot in a rearward direction, the natural taper of the logs will provide clearance for the travel of the stakes. It will be understood, however, that the logs may be alternated on the load so that approximately half are loaded with their butt ends to the front and the other half with their butt ends to the rear. In this case the front and rear stakes would be spaced an equal distance apart.

Since the front stakes 14 and rear stakes are identical with the possible exception of the spacing thereof, the operation of all of the stakes will be explained by reference to the front left side stake 14, which will serve as an example. FIGURE 2 shows the front left side stake 14 in its upright, log retaining position. The stake is pivotably mounted on pin 17 which is carried in mounting bracket 16. A flange 14a is formed on the bottom end of stake 14 below its pivot. The stake is adapted to be pivoted by hydraulic cylinder 18. Piston 18a of the hydraulic cylinder is pivotably attached to flange 14a by pin 19. The other end of cylinder 18 is pivotably attached by pin 20 to a bracket 21 which is bolted to bracket 22 which in turn is welded or otherwise fixedly mounted to the frame 13 of the trailer. FIGURES 3 and 4 show the stake in its horizontal, log releasing position. As fluid is pumped into cylinder 18 via a fluid line (not shown) the piston 18a is extended thus pivoting the stake rearwardly. The hydraulic system is preferably operated from the truck cab or tractor, the pressure to the hydraulic system being normally supplied by a pump driven by the power take-off shaft of the truck. As best seen in FIGURE 4, the stakes in their horizontal position are set a little below the elevation of the trailer top to accommodate the rolling off of the logs. This prevents the stakes from interfering with the unloading of the logs and also protects the stakes from becoming damaged by the falling logs. The stakes in the horizontal position either rest in a socket or on a supporting plate or bar which is preferably a notched out portion 23 of bracket 22. The weight of the stakes is then no longer supported by the hydraulic system. The stakes are maintained in this position when the trailer is empty to prevent vibratory damage, since an empty trailer bounces rather badly. Damage caused by such vibration is considerable with most stakes including those which pivot outwardly from the trailer, since the latter obviously must be transported in the vertical position.

While FIGURE 1 shows the stakes on both sides of the trailer as being pivotable, it is, of course, recognized that if the trailer is always going to be unloaded from one side, only the stakes on that side need be pivotable and the stakes on the other side may be of the stationary or removable type.

The stakes are ordinarily mounted outboard of the trailer frame because of the economy of building straight frames. It will be obvious, however, that the stakes could be adapted to fold down into sockets provided in the trailer bed. While an illustrative embodiment of the invention is shown in the drawings and described in detail herein, the invention is susceptible of embodiment in different forms and it should be understood that the present disclosure is to be considered as an exemplification of the principles of the invention and is not intended to limit the invention to the particular embodiment illustrated. The scope of the invention will be pointed out in the appended claims.

We claim:

1. For use in connection with a vehicle having supporting means tapered from a wide end to a narrow end for carrying logs in a substantially horizontal position with their larger diameter ends toward the wide end, a pair of stakes mounted on opposed sides of the supporting means for retaining and releasing logs from the supporting means, and one stake in each pair being located toward the wide end of the supporting means and the other stake in each pair being located toward the narrow end, at least one pair of stakes being pivotally mounted for movement between upright and horizontal positions about respective axes in a direction toward the narrow end of the supporting means, and means for moving the pivotally mounted pair of stakes between the upright and horizontal positions.

2. The means of claim 1 wherein the stakes are pivotable rearwardly from said upright position to said horizontal position.

3. The means of claim 1 wherein stationary means are provided to support the free ends of said stakes when said stakes are in the horizontal position.

References Cited

UNITED STATES PATENTS

| 1,188,996 | 6/1916 | Richardson | 105—381 |
| 2,546,511 | 3/1951 | Jorgensen et al. | 280—145 |

FOREIGN PATENTS

| 3,438 | 1874 | Great Britain. |
| 17,444 | 7/1907 | Great Britain. |

BENJAMIN HERSH, *Primary Examiner.*

M. S. SALES, P. GOODMAN, *Assistant Examiners.*